United States Patent [19]

Suzuki

[11] Patent Number: 4,917,316

[45] Date of Patent: Apr. 17, 1990

[54] METHOD AND APPARATUS FOR WINDING WIRE TO FORM COIL USING HOOK

[75] Inventor: Yasuyuki Suzuki, Saitama, Japan

[73] Assignee: Sony Corporation, Tokyo, Japan

[21] Appl. No.: 387,154

[22] Filed: Jul. 31, 1989

[30] Foreign Application Priority Data

Aug. 15, 1988 [JP] Japan .................................. 63-203020

[51] Int. Cl.[4] ........................................... B65H 81/102
[52] U.S. Cl. ...................................... 242/4 R; 29/605; 29/737; 29/820
[58] Field of Search ................. 242/4 R, 4 C; 29/605, 29/592.1, 737, 782, 820

[56] References Cited

U.S. PATENT DOCUMENTS 4,424,939 1/1984 Ohashi et al. ...................... 29/605 X
4,625,927 12/1986 Arnold ................................. 242/4 R

FOREIGN PATENT DOCUMENTS 61-500819 4/1986 Japan .
0092309 4/1987 Japan ................................... 242/4 R Primary Examiner—Stanley N. Gilreath
Assistant Examiner—William G. Battista, Jr.
Attorney, Agent, or Firm—Ronald P. Kananen

[57] ABSTRACT

A method for winding wire on a work and an apparatus therefor are disclosed in which wire an end of which is grasped by a clamp, is hooked with a hook, the hooked wire is inserted into a hole provided in the work and, the clamp is then moved according to the drawing of the wire by the hook wherein to a position opposite the hook, the clamp grasping the end of wire is turned with respect to the work to wind the wire on the work. Therefore, pressure contact of the wire with an edge of the hole is eliminated.

13 Claims, 5 Drawing Sheets

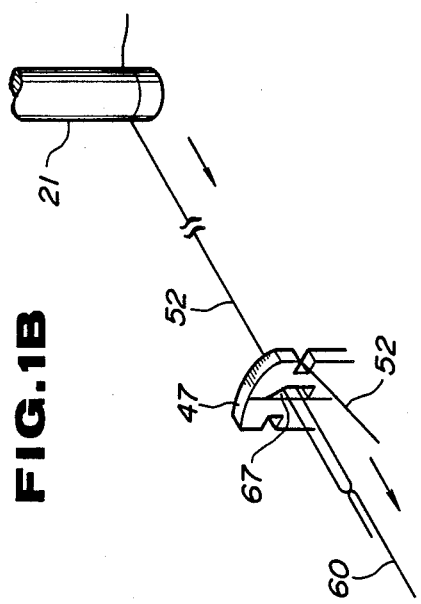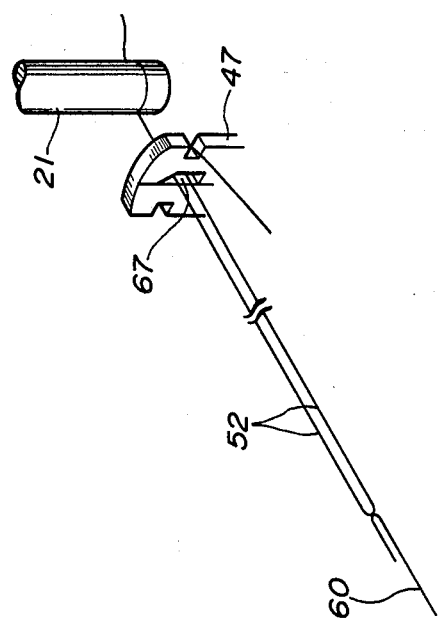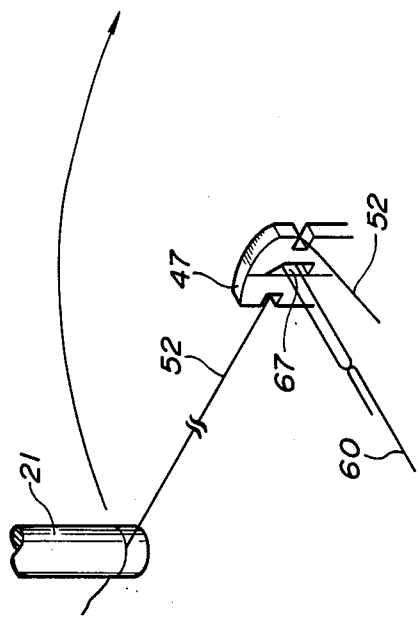

METHOD AND APPARATUS FOR WINDING WIRE TO FORM COIL USING HOOK

BACKGROUND OF THE INVENTION (1) Field of the Invention

The present invention relates to a method and apparatus for winding a wire to form a coil using a hook, in which the wire is inserted into an insert section of a work by means of the hook in which a clamp, for grasping an end of the wire, is rotated relative to the work to carry out the winding of the wire without damage to the wire.

(2) Description of the Background Art

Conventionally, in a case when a wire is wound on a core having a small hole, the wire is inserted into the hole using a hook needle.

In a such a winding apparatus, a hook is used to insert the wire into an insert hole of a work and an end of the wire is grasped by means of a clamp. The clamp then grasps the portion of the wire which has been inserted through the inserting hole and is rotated around the work to form a wire coil.

Such a winding apparatus is exemplified by a U.S. Pat. No. 4,625,927 issued on Dec. 2, 1986.

However, there are disadvantages in the above-described, winding apparatus. For example, since the work has an edge around the inserting hole, the enamel-coated insulating envelope of the wire may be damaged from contact pressure with the edge. Electrical leakage between the wire and core therefore occurs. In a worst case, wire breakage may occur due to contact pressure between the insulating envelope and the edge. For this reason, the possible number of turns of the coil cannot be increased.

In addition, the wire is flexed and deformed by this process and may become kinked. This problem is not easily remedied. If the wire becomes twisted in its intermediate portion, continuing the winding operation to the terminal end of the wire becomes difficult.

Furthermore, since the wire is struck on the edge, the movement speed of the hook cannot be increased to increase the speed of the winding operation.

Since the hook described above conventionally has a diameter of about 0.08 mm, the wire is drawn and struck on the edge by means of a hook having a small diameter. Hence, the insulating envelope of the wire can become damaged and produce electrical current leakage. In addition, since the wire is pressed and struck on the edge which has as the same number as the number of turns of winding, breakage may occur along the wire at any point. For this reason, the drawing speed of the wire by means of the hook cannot become great or deformation or kinking of the wire occurs.

SUMMARY OF THE INVENTION

It is, therefore, an object of the present invention to provide a method and apparatus for winding a wire to form a coil using a hook which will impart less damage to the wire, allowing an increase in the number of turns of a winding operation, and an increase in the drawing speed of the wire.

The above-described object can be achieved by providing a method for winding a wire on a work using a hook, comprising the steps of: (a) hooking a wire, the end of which is grasped by a clamp; (b) inserting the hooked wire into a hole provided on the work; (c) moving the clamp to a position opposite the position of the hook with respect to the hole of the work when drawing the wire with the hook; and (d) turning the clamp which grasps the end of the wire with respect to the work so as to wind the wire on the work.

The above-described object can also be achieved by providing an apparatus for winding a wire on a work, comprising:(a) a first means having a hook used for hooking the wire and for inserting the wire into a space defined in the work, the first means drawing the wire with the hook in a direction away from the space; and (b) second means having a clamp for grasping an end of the wire when the wire is inserted into the space, the second means moving the clamp to a position opposite the position of the hook with respect to the space in the work. When the first means draws the wire via the hook in the direction of the clamp, the clamp grasps the end of wire and moves with respect to the work to wind the wire on the work.

The above-described object can also be achieved by providing a method for winding a wire on a head core for a magnetic disc to form a coil, comprising the steps of: (a) hooking a wire whose end is grasped by a clamp; (b) inserting the hooked wire into a gap space defined in the core; (c) moving the clamp to a position opposite the wire drawing position of the hook with respect to the gap space in the core; and (d) turning the clamp grasping the end of the wire with respect to the gap space in the work to wind the wire on the core.

BRIEF DESCRIPTION OF THE DRAWINGS

FIGS. 1A through 1C are perspective views of an essential part of the apparatus for winding a wire on a work using a hook in a preferred embodiment according to the invention showing a drawing operation for wire.

DETAILED DESCRIPTION OF THE PREFERRED EMBODIMENT

Reference will hereinafter be made to the drawings in order to facilitate a better understanding of the present invention.

Figure 3:
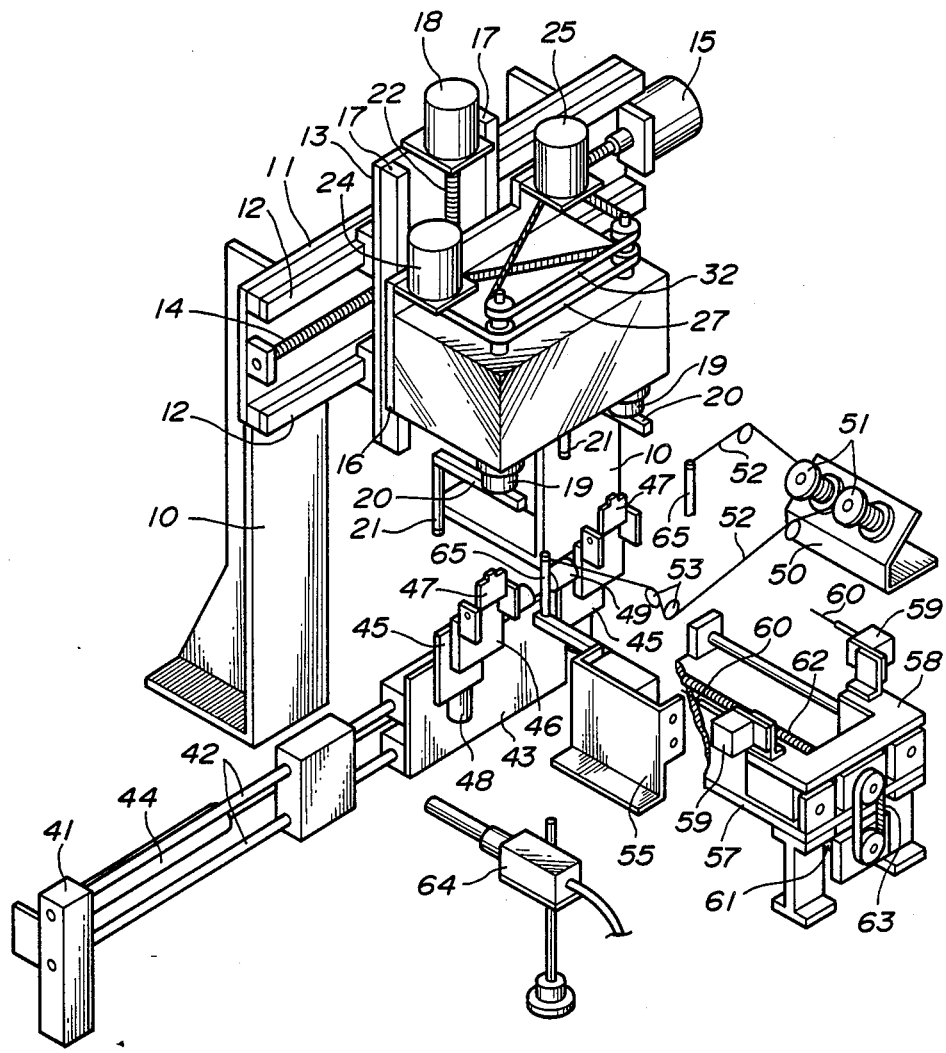
FIG. 3 is a schematic drawing of a whole winding apparatus.

FIG. 3 shows an overall view of an apparatus for winding a wire on a work using a hook in a preferred embodiment according to the present invention.

A pair of left and right upstanding frames 10 are installed. An upper end of the pair of the frames 10 is linked by means of a plate 11 extending laterally. A pair of upper and lower rails 12 are disposed in the lateral direction on the plate 11. A lateral slide base 13 is slidably supported by means of the pair of rails 12. The base 13 is moved in a lateral direction by means of a motor 15 via a feed screw 14. A longitudinal slide base 16 is movably supported by means of the pair of rails 17 on the lateral slide base 13. The base 16 can be moved upwards or downwards by means of another motor 18 and a second feed screw 22. A pair of clamp drive portions 19 are mounted on the longitudinal slide base 16 and racks 20 are mounted at a lower end of the clamp drive portions 19. A clamp 21 is aligned at the level of the rack 20.

Figure 4:
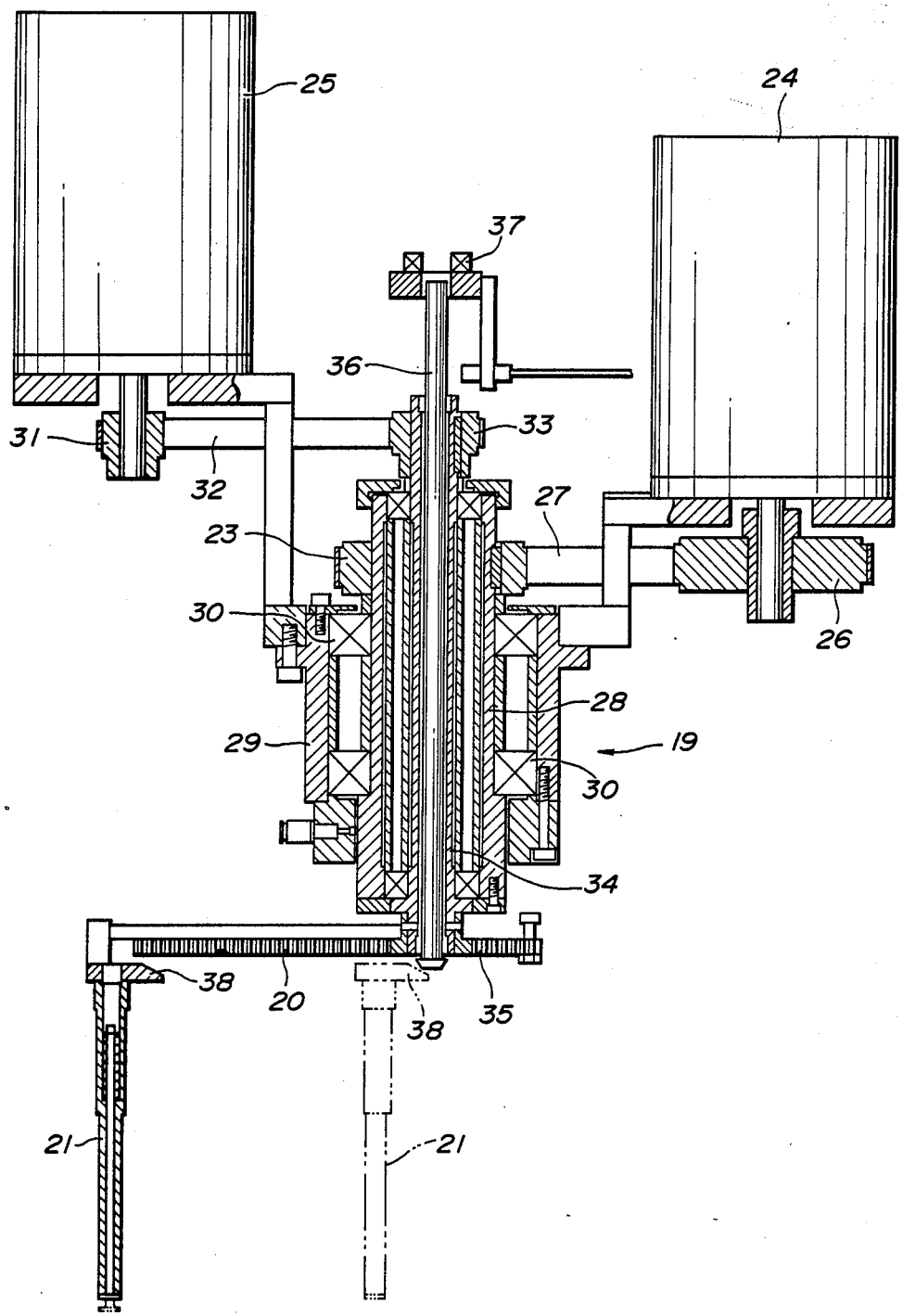
FIG. 4 is a longitudinal cross sectional view of the essential part of the winding apparatus.
Figure 5A:
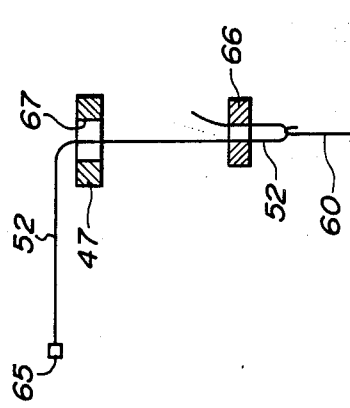
FIGS. 5A through 5F are elevated views illustrating a wire winding operation carried out by the winding apparatus shown in FIG. 3.
Figure 5B:
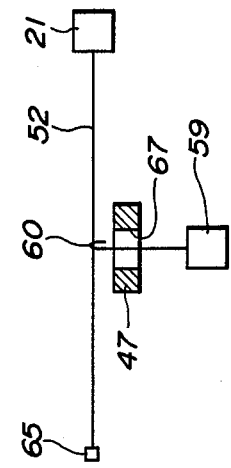
Figure 5C:
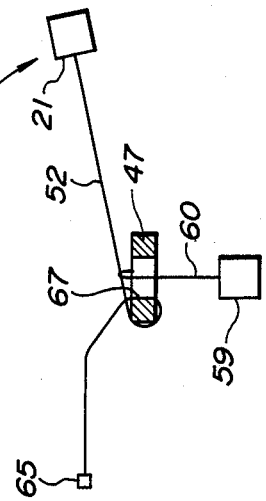
Figure 5D:
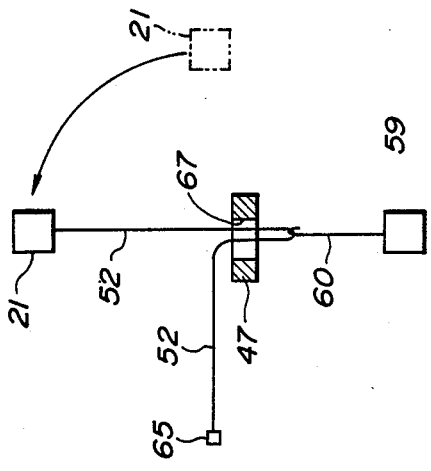
Figure 5E:
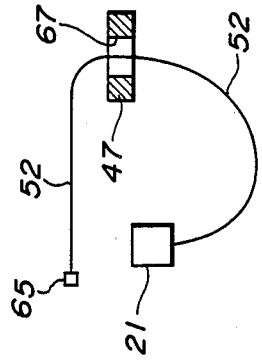
Figure 5F:
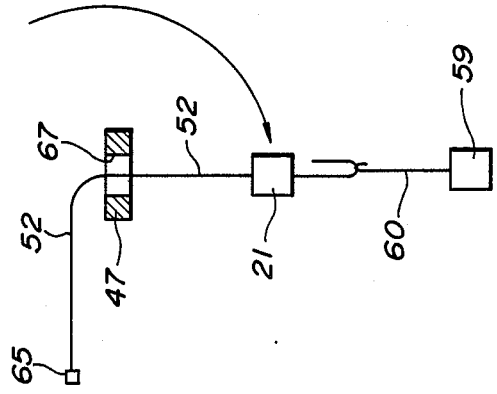

The clamp drive portion 19 is provided with a rotating drive motor 24 and an extending drive motor 25. The rotating drive motor 24 is connected to a pulley 23 via a pulley 26 and a belt 27, as shown in FiG. 4. The pulley 23 is fixed to a sleeve 28, as seen in FIG. 4. The sleeve 28 is rotatably supported via a bearng 30. The extending motor 25 is connected to a pulley 33 via a pulley 31 and belt 32. The pulley 33 is fixed to an upper end of the spindle 34. A pinion 35 is fixed to a lower end of the spindle 34 so as to mesh with the rack 20. The spindle 34 has a hollow portion. A detecting rod 36 is inserted therein. Upward and downward operations are detected by means of a sensor 37 installed on an upper end of the spindle 34. A lower end of the rod 36 is pressed against a dog 38 installed on the clamp 21.

A pair of upper and lower rods 42, which are supported by means of a frame 41 as shown in FIG. 3, are extended at a side below the pair of clamp drive portions 19. A work holding base 43 is slidably supported in the lateral direction by means of the rods 42. The base 43 is linked, via a rod, to a cylinder 44. A mounting plate 46 is attached to the base 43 via an auxiliary base 45. A work 47 is mounted on the mounting plate 46. The work 47 is moved in an upward or downward direction by means of a Z-axis directional motor 48. Furthermore, the pair of mounting plates 46 cooperate with a Y-axis directional motor 49 for moving the work in a lateral direction.

A bobbin stand 50 is disposed on a side portion of the work supporting base 43. A pair of bobbins 51 are rotatably supported by means of the bobbin stand 50. A wire 52 is wound around the bobbins 51, threaded through a guide rail 53, to the work 47. In addition, a second clamp 65 is arranged proximate the work 47. The second clamp 65 is supported by means of a supporting body 55.

A frame 57 is disposed in front of the work supporting base 43, on which a slide base 58 is movably supported. A hook 60 is supported on the slide base 58 via a block 59. The slide base 58 is moved by means of a motor 61, belt 63, and a feed screw 62. A CCD camera 64 is arranged on a side portion of the frame 57. The CCD camera 64 detects the position of the work 47.

A winding operation by the above described apparatus will be explained below.

A work 47 which constitutes, for example, a core of a VTR (Video Tape Recorder) magnetic VTR head is mounted on the work supporting base 43 via the mounting plate 46 and the auxiliary base 45. The cylinder 44 is then operated to move the work 47, via the base 43, to the winding position. It is noted that the position of the work 47 is detected by means of the CCD (Charge Coupled Device) camera 64. If the work 47 is not placed in position, system feedback is carried out to move the work to the position.

An auxiliary clamp 65 draws the wire 52 from the bobbin 51 in such a way that the wire 52 is guided to a position opposite the hook 60. The motor 61 is driven so that the base 58 is moved in the forward direction. The hook 60 is inserted into the inserting hole 67 of the work 47 as shown in FIG. 1A. The wire 52 is hooked by means of the hook 60. The wire 52 is inserted into an inserting hole 67 constituted by a small hole.

If the wire 52 is inserted into the inserting hole 67 of the work or (core) 47, the clamper 21 grasps the wire 52 to rotate the wire 52 with respect to the work 47. Such a rotation is carried out by means of a motor 24 shown in FIG. 4. The rotation of the motor 24 is transmitted to the sleeve 28 via the pulley 26, belt 27, and pulley 23, the sleeve 28 thereby rotating the rack 20.

The inserting operation of the wire by means of the hook 60 into the inserting hole 67 and the rotation operation by means of the clamp 21 are repeated by a number of turns so that the wire 52 is wound on a magnetic core 47 of a magnetic head to form a coil. It is thereby possible to manufacture magnetic heads for VTRs by winding the wire around the core 47 using the above described winding apparatus.

FIG. 5 shows the operational steps of winding to form a coil by means of the winding apparatus described above.

If the wire 52 is inserted into the inserting hole 67 of the work 47 as shown in FIG. 5 (A), the clamp 21 is rotated trrough 90 degrees as shown in FIG. 5 (B). Thereafter, the clamp 21 releases the end of the wire 52, drawing the hook 60 back through the hole 67 into which it was inserted, and drawing with it the end of the wire which was released by the clamp 21. Thus the wire is inserted into the inserting hole 67 of the work 47. It is noted that at this time that a spectacle guide 66 is used to prevent the wire 52 from looping or overextending. In this way, the clamp 21 is rotated 180 degrees in the clockwise direction as shown in FIG. 5D, grasping a portion of a tip of the wire 52 inserted through the inserting hole 67 of the work 47. Thereafter, the clamp 21 is rotated about 270 degrees as shown in FIGS. 5E and 5F. Thus, the wire 52 is wound in one turn, and placed in position to be reinserted into the inserting hole 67 of the work 47. This operation is repeated a specified number of turns to form the coil on the core 47.

As the number of turns of the wire 52 gradually increases, the length of the wire 52 is correspondingly consumed, thereby gradually reducing the length of the remaining wire 52. As the length of the remaining wire 52 becomes shorter, the clamp 21 moves further toward the center of the clamp drive portion 19. That is to say, the rotation of the motor 25 is transmitted to the spindle 34 via the pulley 31, belt 32, and pulley 33 as shown in FIG. 4. A pinion 35 installed on a lower end of the spindle 34 causes the rack 20 to move gradually toward the center of the clamp drive portion 19. This operation causes the clamp 21 to accurately move toward the center of the drive portion 19 according to the length of the remaining wire 52.

Due to winding the wire 52 on the work 47, the clamp 21 rotates with the center of the clamp drive portion 19 as shown in FIG. 4 as its axis. At this time, the rack 20 rotates and is moved along the pinion 35. Hence, the rack 20 is thereby carried in the longitudinal direction by means of the pinion 35. To offset this movement, the motor 25 drives the pinion 35 to move progressively in the opposite direction, thereby neutralizing longitudinal movement by the movement of the rack 20 on the pinion 35.

Figs. 1A through 1C illustrate the rotating operation of the clamp 21 when the wire 52 is drawn by means of the hook 60.

As shown in FIG. 1A, the clamp 21 which grasps the end of the wire 52 is at a position 90 degrees to its drawing-in direction. In this state, the wire 52 is hooked by the hook 60, and drawn into the inserting hole 67 of the work 47. Thereafter, the clamp 21 is rotated 90 degrees as shown in FIG. 1B, moving to a position opposite the hook 60 with respect to the inserting hole 67 of the work 47. Thus, the wire 52 is extended straight. The clamp 21 and hook 60 are synchronized and move in the same direction.

In this way, before the wire 52 is drawn through the insert hole 67 by means of the hook 60, the wire clamp 21 and hook 60 are arranged at right angles with respect to the inserting hole 67, but as the wire is drawn into the hole the clamp 21 and the hook 60 assume positions opposite each other. Therefore, since there is no rubbing or pressure contact between the wire 52 and the sides of the insert hole 67, damage to the wire, particularly the enamel insulating envelope thereof, can be reduced. Also, curling of the wire 52 is prevented. These factors combine to insure that electrical leakage is reduced between the wire 52 and work 47.

Because damage to the wire 52 from the edge of the inserting hole 67 of the work 47 is prevented, the cycle time for winding to complete the coil can be shortened and the draw-up speed increased. Therefore, productivity (yield) can be improved.

In a case where the diameter of the wire 52 and/or the hook 60 is very small, the wire can be easily damaged by bending against the hook during the winding operation. In such a case, the wire can be retained by a rounding pin 54 immediately after being drawn through the hole 67, as shown in FIGS. 2A through 2D.

Figure 2A:
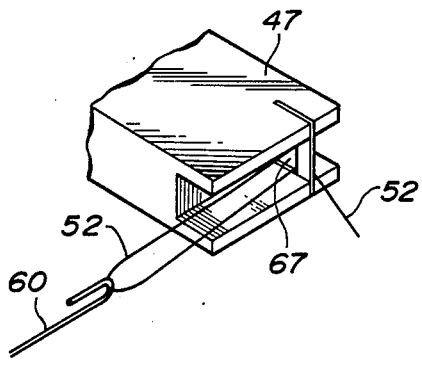
FIGS. 2A through 2D are perspective views of the essential part of the winding apparatus illustrating a drawing operation using a rounding pin.
Figure 2C:
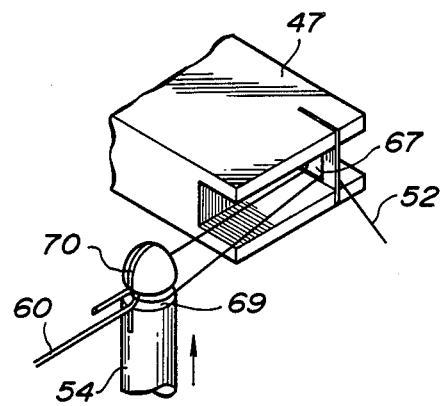
Figure 2B:
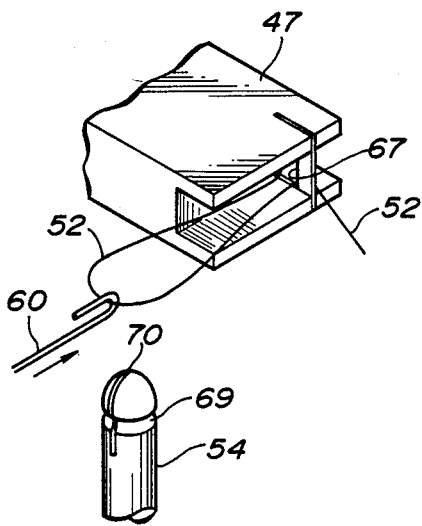

In the case where a magnetic head for the reading of hard discs is manufactured by the apparatus for winding according to the preferred embodiment, the hook 60 is used to draw the wire 52 into the inserting hole 67 of the work 47 constituting the core as shown in FIG. 2A. Thereafter, the hook 60 is returned to some degree in a direction opposite to the draw-in direction of the hook 60, as shown in FIG. 2B.

Figure 2D:
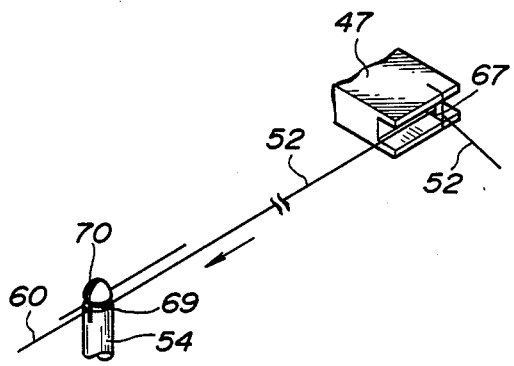

At this time, the loop formed in the wire 52 becomes larger. A rounding pin 54 is inserted into this loop as shown in FIG. 2C. At this time, the wire 52 is suspended in a groove 69 of the pin 54 and the hook 60 is accepted into a slit 70 of the pin 54. Then, when the pin 54 is moved in the draw-in direction as shown in FIG. 2D, the wire 52 can be drawn up.

For winding operations around the work 47 having a small hole 67 using a hook 60, a method in which a pin 54 having a large curvature is used in place of the hook 60 is adopted. At this time, contact of the wire 52 on the edge of the small hole is prevented by means of a hook 60 having a small diameter suited for handling very fine wire and thereby damage to the wire is minimized. Curling of the wire is also prevented. This effectively prevents electrical leakage between the wire 52 and work 47.

Furthermore, as the draw-up speed of the wire 52 is increased, the cycle-time for completing a winding operation can be shortened. Since the wire 52 is not struck on the edge of the inserting hole, the yield of the coil is increased.

As described hereinabove, since in the method and apparatus for winding the wire using the hook, the clamp is moved to a position opposite the hook with respect to the inserting hole of the work when the wire is drawn by the hook, or a drawing member having a larger curvature than the hook is installed and the wire is drawn with the drawing member inserted into a loop in the wire after the wire is inserted into the inserting hole by means of the hook, the wire does not suffer damage from the edge of the inserting portion of the work or from the hook. Curling of the wire is prevented and also leakage between the wire and the work. The cycle-time for a complete winding operation can be shortened by increasing the speed at which the wire is drawn up. The yield of the coil can be improved since the wire is not damaged due to the presence of hook.

It will be appreciated by those skilled in the art that the foregoing description is made in terms of the preferred embodiment and various changes and modifications may be made without departing from the scope of the present invention which is defined by the appended claims.

What is claimed is:

1. A method for winding a wire on a work using a hook, comprising the steps of:
   (a) hooking a wire whose end is grasped by a clamp;
   (b) inserting the hooked wire into a hole provided on the work;
   (c) moving the clamp to a position opposite the position of the hook with respect to the hole of the work when drawing the wire with the hook; and
   (d) turning the clamp grasping the end of the wire with respect to the work so as to wind the wire on the work.

2. An apparatus for winding a wire on a work, comprising:
   (a) first means having a hook used for hooking the wire and for inserting the wire into a space defined in the work, the first means drawing the wire with the hook in a direction away from the space; and
   (b) second means having a clamp for clamping an end of the wire when the wire is inserted into the space, the second means moving the clamp to a position opposite the position of the hook with respect to the space defined in the work when the first means draws the wire by means of the hook in the direction away from said space and turning the clamp grasping the end of wire with respect to the work to wind the wire on the work.

3. An apparatus as set forth in claim 2, which further comprises a drawing member having a larger curvature than the hook, the drawing member being inserted into a loop formed by the wire at a position adjacent the hook when the first means draws the wire inserted into the space in the work in the direction away from said space and returns the wire slightly toward the work drawing the wire in slightly toward the work to form said loop.

4. An apparatus as set forth in claim 2, which further comprises third means for moving the clamp toward its turning axis by a predetermined distance whenever the second means turns the wire on the work by one turn.

5. An apparatus as set forth in claim 4, wherein the wire has an insulating coating around an outer periphery of the wire.

6. An apparatus as set forth in claim 5, wherein the insulating coating is made of an enamel.

7. An apparatus as set forth in claim 2, wherein the work is a coil apparatus for a magnetic disc read/write device.

8. An apparatus as set forth in claim 7, wherein the coil apparatus is a head for a magnetic disc read/write device.

9. An apparatus as set forth in claim 3, wherein the drawing member is a pin extended between the hook and work, having a groove extended around a periphery thereof for receiving a portion of a wire formed in a loop and a slit extended vertically with respect to the groove into the pin aligned for receiving the hook.

10. An apparatus as set forth in claim 9, wherein the hook is formed in a letter U shape.

11. A method for winding a wire on a head core for a magnetic disc read/write device to form a coil, comprising the steps of:
   (a) hooking a wire whose end is grasped by a clamp;
   (b) inserting the hooked wire into a gap space defined in the core;
   (c) moving the clamp to a position opposite the hook with respect to the gap in the core when drawing the wire with the hook; and
   (d) turning the clamp grasping the end of the wire with respect to the gap in the work to wind the wire on the core.

12. A method as set forth in claim 11, wherein prior to step (c), a drawing member having a larger curvature than the hook is inserted into a loop formed in the wire by drawing the wire inserted into the gap in a direction away from said gap and then returning the wire slightly toward the core.

13. A method as set forth in claim 11, further comprising the step of (e) moving the clamp toward its turning axis by a predetermined distance whenever the wire is turned on the work by one turn.

* * * * *